United States Patent
Ciholas et al.

(10) Patent No.: US 8,401,716 B2
(45) Date of Patent: Mar. 19, 2013

(54) FLIGHT CONTROL SYSTEMS

(75) Inventors: Philippe A. Ciholas, Sedgwick, KS (US); Mark W. Palmer, Peru, KS (US)

(73) Assignee: Textron Innovations Inc., Providence, RI (US)

( * ) Notice: Subject to any disclaimer, the term of this patent is extended or adjusted under 35 U.S.C. 154(b) by 1461 days.

(21) Appl. No.: 11/669,565

(22) Filed: Jan. 31, 2007

(65) Prior Publication Data

US 2007/0267548 A1 Nov. 22, 2007

Related U.S. Application Data

(63) Continuation-in-part of application No. 11/383,791, filed on May 17, 2006.

(51) Int. Cl.
| | |
|---|---|
| G01C 23/00 | (2006.01) |
| G05D 1/00 | (2006.01) |
| G05D 3/00 | (2006.01) |
| G06F 17/00 | (2006.01) |
| G06F 7/00 | (2006.01) |
| B64C 19/00 | (2006.01) |
| B64C 13/00 | (2006.01) |
| B64C 3/18 | (2006.01) |
| B64C 13/16 | (2006.01) |
| B64C 17/00 | (2006.01) |
| B64C 9/00 | (2006.01) |
| B64C 13/40 | (2006.01) |

(52) U.S. Cl. ............ 701/3; 244/75.1; 244/76 R; 244/87; 244/227

(58) Field of Classification Search ...... 701/3; 244/75.1, 244/76 R, 195, 87, 227, 226, 228, 223, 229
See application file for complete search history.

(56) References Cited

U.S. PATENT DOCUMENTS

| | | | |
|---|---|---|---|
| 2,277,378 A | | 3/1942 | Wells |
| 2,408,770 A | | 10/1946 | Frisch et al. |
| 2,451,263 A | | 10/1948 | Webb |
| 2,590,029 A | | 3/1952 | Minorsky |
| 2,595,192 A | * | 4/1952 | Garby .............................. 244/87 |
| 2,620,772 A | | 12/1952 | McLane |
| 2,627,847 A | * | 2/1953 | Clark et al. ................... 91/369.1 |
| 2,686,896 A | | 8/1954 | Mathews |
| 2,865,337 A | | 12/1958 | Dennis et al. |
| 2,870,745 A | | 1/1959 | Kenyon et al. |
| 2,953,325 A | | 9/1960 | Hadekel |
| 2,971,726 A | * | 2/1961 | Bratt et al. ................... 244/76 R |
| 2,991,028 A | | 7/1961 | Sedgfield et al. |
| 3,489,379 A | | 1/1970 | Bogart |
| 3,528,633 A | | 9/1970 | Knerneyer |
| 3,578,270 A | | 5/1971 | Ellis |
| 3,592,418 A | * | 7/1971 | Wood ............................ 244/226 |

(Continued)

FOREIGN PATENT DOCUMENTS

FR 1104903 11/1955

OTHER PUBLICATIONS

Select File History from related U.S. Appl. No. 11/383,791, dated Dec. 17, 2009 through Jul. 6, 2012, 95 pages.

*Primary Examiner* — Khoi Tran
*Assistant Examiner* — Nicholas Kiswanto
(74) *Attorney, Agent, or Firm* — Lathrop & Gage LLP

(57) ABSTRACT

A system and method for a controlling an aircraft with flight control surfaces that are controlled both manually and by a computing device is disclosed. The present invention improves overall flight control operation by reducing the mechanical flight control surface components while providing sufficient back-up control capability in the event of either a mechanical or power-related failure. Through the present invention, natural feedback is provided to the operator from the mechanical flight control surface which operates independent of computer-aided flight control surfaces.

8 Claims, 8 Drawing Sheets

U.S. PATENT DOCUMENTS

| | | | | |
|---|---|---|---|---|
| 3,750,985 A | | 8/1973 | Wheldon | |
| 3,753,350 A | * | 8/1973 | Nott | 60/403 |
| 3,765,624 A | * | 10/1973 | Kaniuka | 244/227 |
| 3,945,593 A | * | 3/1976 | Schanzer | 244/181 |
| 4,017,045 A | | 4/1977 | Kirchhein | |
| 4,236,685 A | | 12/1980 | Kissel | |
| 4,472,780 A | | 9/1984 | Chenoweth et al. | |
| 4,477,044 A | | 10/1984 | Darcy et al. | |
| 4,759,515 A | | 7/1988 | Carl | |
| 4,762,294 A | * | 8/1988 | Carl | 244/99.9 |
| 4,793,576 A | * | 12/1988 | Frerk | 244/228 |
| 4,964,599 A | * | 10/1990 | Farineau | 244/195 |
| 5,082,208 A | * | 1/1992 | Matich | 244/78.1 |
| 5,238,207 A | | 8/1993 | Wallace et al. | |
| 5,489,830 A | * | 2/1996 | Fernandez | 318/628 |
| 5,735,490 A | | 4/1998 | Berthet et al. | |
| 5,797,564 A | | 8/1998 | Cartmell et al. | |
| 5,868,359 A | | 2/1999 | Cartmell et al. | |
| 5,908,177 A | * | 6/1999 | Tanaka | 244/223 |
| 6,000,662 A | | 12/1999 | Todeschi et al. | |
| 6,241,182 B1 | * | 6/2001 | Durandeau et al. | 244/99.4 |
| 6,269,733 B1 | * | 8/2001 | Reust | 91/415 |
| 6,622,973 B2 | * | 9/2003 | Al-Garni et al. | 244/206 |
| 7,913,955 B2 | * | 3/2011 | Jones | 244/226 |

* cited by examiner

FLIGHT CONTROL SYSTEMS

CROSS-REFERENCE TO RELATED APPLICATIONS

This application is a continuation in part of and claims the benefit of U.S. patent application Ser. No. 11/383,791 filed May 17, 2006, the disclosure of which is incorporated herein by reference.

BACKGROUND OF THE INVENTION

1. Field of the Invention

The invention relates generally to methods of controlling an aircraft in flight. More specifically, the invention relates to the field of manipulating control surfaces on an aircraft, e.g., ailerons, flaps to aerodynamically control flight characteristics.

2. Description of the Related Art

Aircraft are typically controlled by moveable aerodynamic surfaces on the wing and tail for controlling the altitude and attitude of the aircraft in flight, including roll, pitch, and yaw. Small aircraft can use simple mechanical linkages to transmit the operator's control inputs to these surfaces. Larger and faster aircraft need power assisted or fully-powered control systems. Most powered control systems use mechanical linkages to command the surface actuators, but "fly-by-wire" and "fly-by-light" are becoming more common. In these systems, the mechanical linkage is replaced by a computerized command and feedback loop.

While manually operated control systems provide a direct and reliable link between the operator's input and the movement of the aircraft control surfaces, these mechanical systems tend to have a poor failure tolerance, and as such, require redundant and independent load paths for continued safe flight and landing, in the event of a failure. As a result, additional hardware and mechanisms are required to provide this redundancy.

With a manual system, the work available at the control surface is limited by the force and travel that an operator can apply to the cockpit controls. As the speed and size of aircraft increase, manual control of the aircraft becomes inadequate to effectively maneuver the aircraft. Various means, including servo tabs and fully powered systems, have been employed to provide the additional force necessary to move the control surfaces. However, these systems add complexity and additional failure modes. For example, fully powered systems are dependent on their power sources, which themselves must be highly redundant. Failure of a fully powered system, without having a manual reversion or back-up, would result in complete failure, and lack of control, of any aircraft control surface. Furthermore, fully powered systems do not provide natural force feedback to the operator. Therefore, artificial feel systems must be added when such a control system is utilized.

The evolution of aircraft design and technology have resulted in a class of aircraft, such as many larger business class jets, that cannot be completely controlled manually and require power-aided controls and would benefit from computer-aided controls. However, fully powered and completely computerized controls, such as fly-by-wire, are not warranted.

SUMMARY

The present invention is defined by the claims below. Embodiments of the present invention solve at least the above problems by providing a system and method for controlling aircraft flight control surfaces both manually and through a computing device. The system improves overall flight control operation by reducing the manual flight control surface requirements, supplementing those controls with powered controls, and providing sufficient back-up controls in the event of failures.

In one embodiment, the system of the present invention includes a control surface having first and second portions. The first portion is controlled using a substantially mechanical arrangement. The second portion is electronically angularly controlled.

The mechanical arrangement used to control the first portion, in one embodiment, includes a mechanical linkage which receives mechanical input from a user in a cockpit of the aircraft. The translation may be accomplished using a mechanism is the cockpit of the aircraft. The mechanism may be one of foot controlled and hand controlled. A force sensor which is adapted to measure operator effort may be included on the mechanism. This sensor creates signals in response to operator effort and is transmitted to a computing device which then operates an electronically controlled actuator for the purpose of controllably positioning the second portion at angular orientations which are substantially the same as those of the first portion.

The control surface may be a flap, rudder, elevator, aileron, or other like surface on an aircraft.

The control surface may also include a third portion. This third portion would also be electronically controlled in response to the signals and also operate at substantially the same angular orientations as the first and second portions.

An associated method of operating a control surface on an aircraft is also disclosed. This method includes comprising the control surface such that it has first and second portions. The method also may include: (i) providing a device which receives inputs from a user via a mechanical system and angularly displaces the first portion and (ii) electronically controlling the second portion to angularly displace the second portion at angular orientations substantially equal to those of the first portion. This process might involve using a sensor on the mechanical system and a computer to accomplish the electronic controls for the second portion. Further, the method could involve locating the sensor on a control stick and then measuring operator effort using the sensor.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and a method for providing aircraft flight control having natural feedback to an operator while providing the operator with increased performance benefits of a computerized control system. Utilizing a computer-controlled flight control system, in combination with a manual system having natural feedback provides excellent fault tolerance because of the continuous independent parallel systems. The term "computer" should be understood to include any type of device having memory and processing capability, and is not meant to be limited to any particular type of computing device. Should one portion of the system fail, the alternate control paths provide sufficient control authority for continued safe flight and landing. Furthermore, utilizing a flight control system having a portion of the flight control surface being controlled by a computing device reduces the quantity of mechanical linkages that can be prone to fatigue, wear, and possible failure. Controlling a portion of the flight surfaces manually allows an operator to receive direct natural feedback through the mechanical linkage, giving the pilot direct "feel" for what is occurring aerodynamically to the aircraft.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware.

Figure 1:
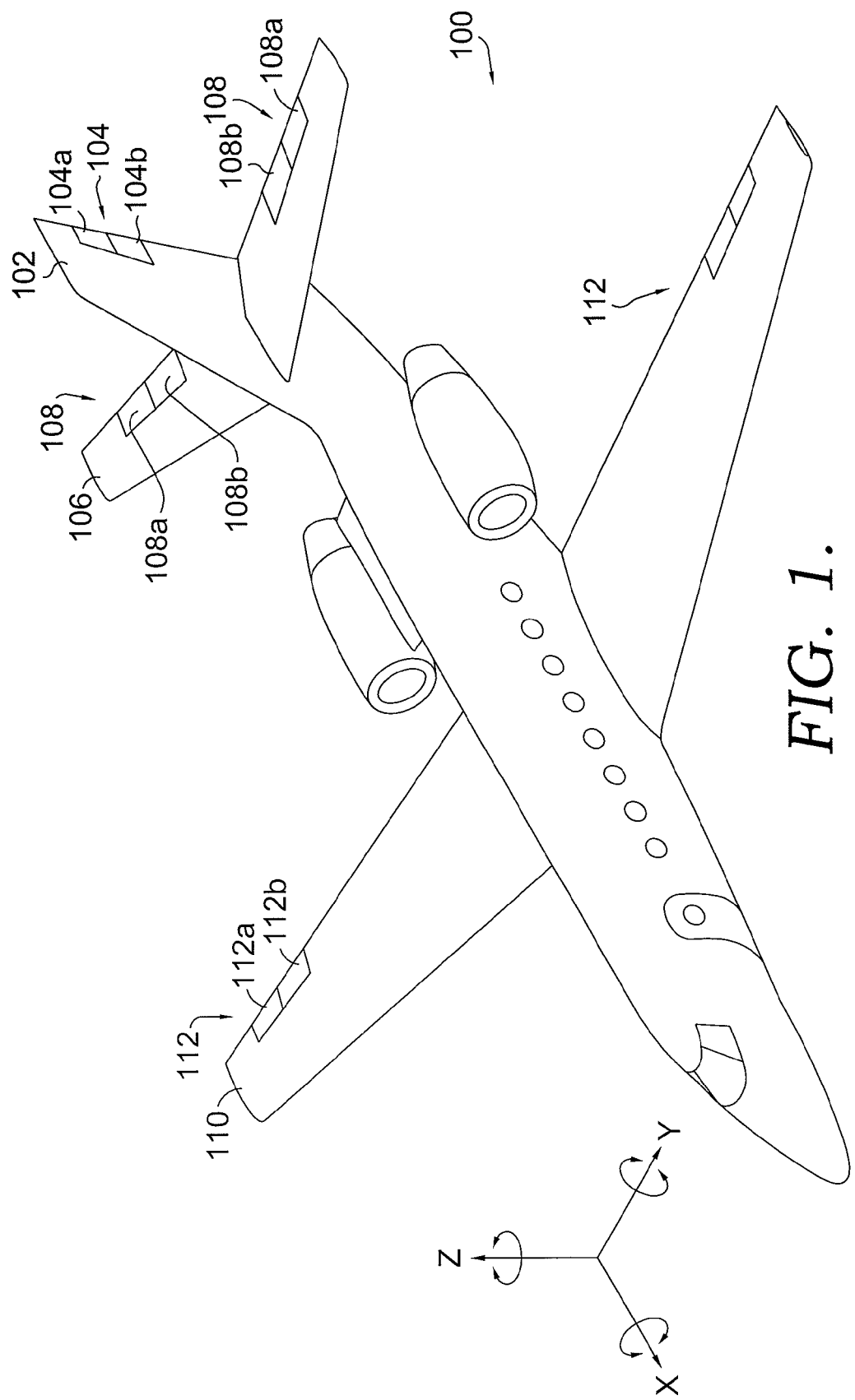
FIG. 1 is a perspective view of the control surfaces of an aircraft.

As aircraft increase in gross weight and airspeed, it becomes more difficult for an operator to manually control the aircraft through the entire flight envelope, such that in order to perform as desired, the use of power assisted control surfaces becomes desirable, and often necessary. Referring now to FIG. 1, an aircraft exhibiting these characteristics and therefore utilizing the present invention is shown in a perspective view. For discussion purposes, one example is a larger executive business jet.

The present invention is applicable to a variety of control surfaces, and FIG. 1 shows one possible configuration of the present invention as applied to control surfaces such as flaps/rudders, elevators, and ailerons. For example, aircraft 100 has a vertical stabilizer 102 having a rudder, or control surface, 104. For the embodiment shown in FIG. 1, rudder 104 has two independent segments, 104a and 104b. While each of these segments move independently for controlling the yaw of the aircraft, or movement about the z-axis, their combined effects produce the desired yaw response for a given operator's input command.

Figure 2:
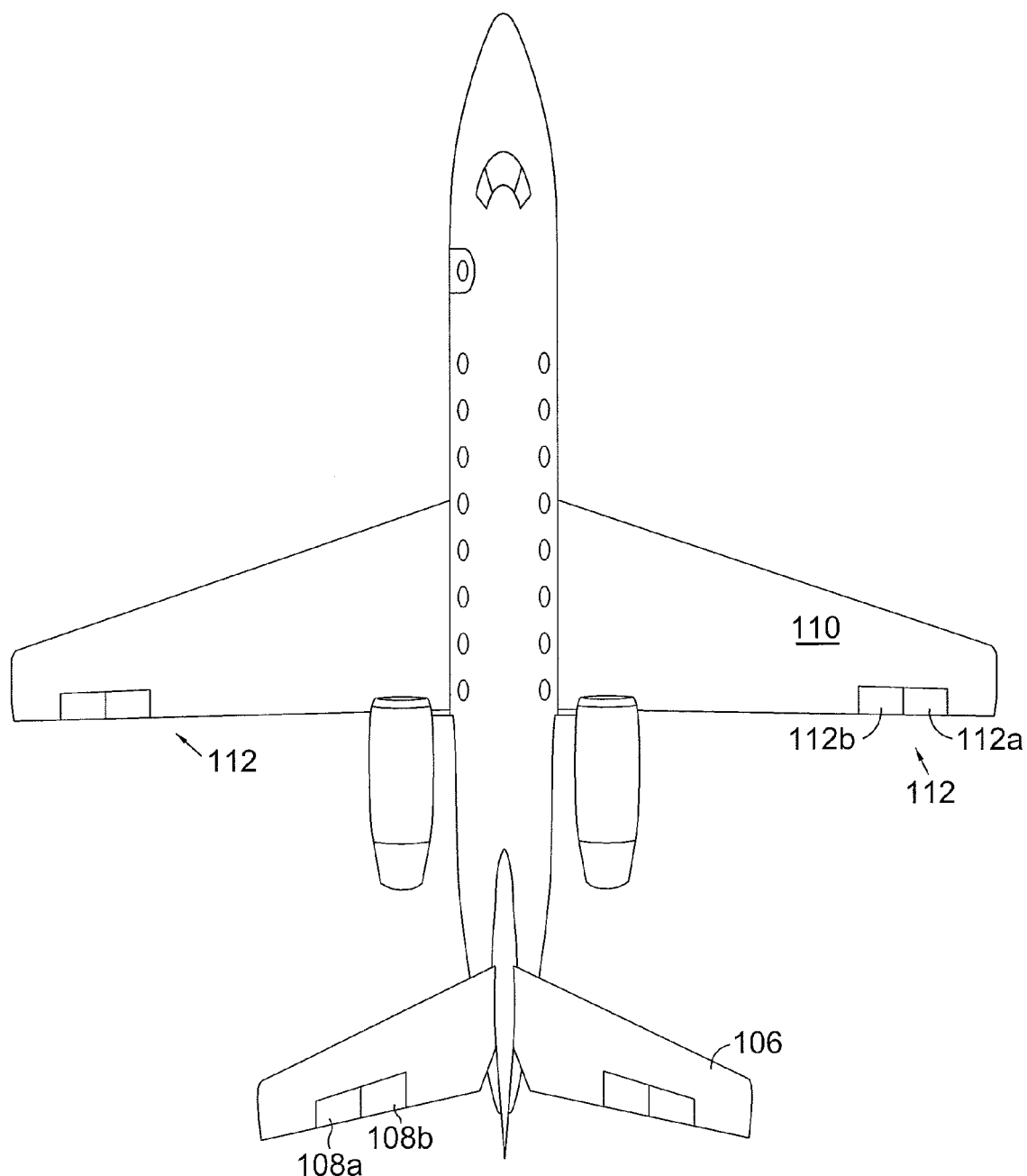
FIG. 2 is a top elevation view of the aircraft of FIG. 1.

Aircraft 100 also includes a horizontal stabilizer 106 having a plurality of control surfaces 108. For the embodiment shown in FIGS. 1 and 2, each control surface 108 has individual segments 108a and 108b. While each of these segments move independently for controlling the pitch of the aircraft, or movement about the Y-axis, their combined effects produce the desired response for a given operator's input command.

Aircraft 100 also has a wing 110 having ailerons 112. The ailerons 112 each have a plurality of individual segments 112a and 112b and can each move up and down, such that they move in opposition to the ailerons on the opposite wing. The ailerons are utilized for controlling the roll rate of the aircraft, or motion about the x-axis of the aircraft. For example, raising the ailerons on the right wing, causes air passing over the wing to push on the ailerons, and push the right wing down, and lowering ailerons on the left wing causes air passing underneath the wing to push on the ailerons to raise the left wing. The result of such a control surface movement is the aircraft rolling to the right. To roll the aircraft to the left, the opposite aileron position is required. While ailerons 112a and 112b move independently for controlling the roll rate of the aircraft, their combined effects produce the desired roll response for a given operator's input command. Spoilers and speedbrakes are also common and can be combined with ailerons for additional roll control and can be directly used for lift and drag control.

Figure 3A:
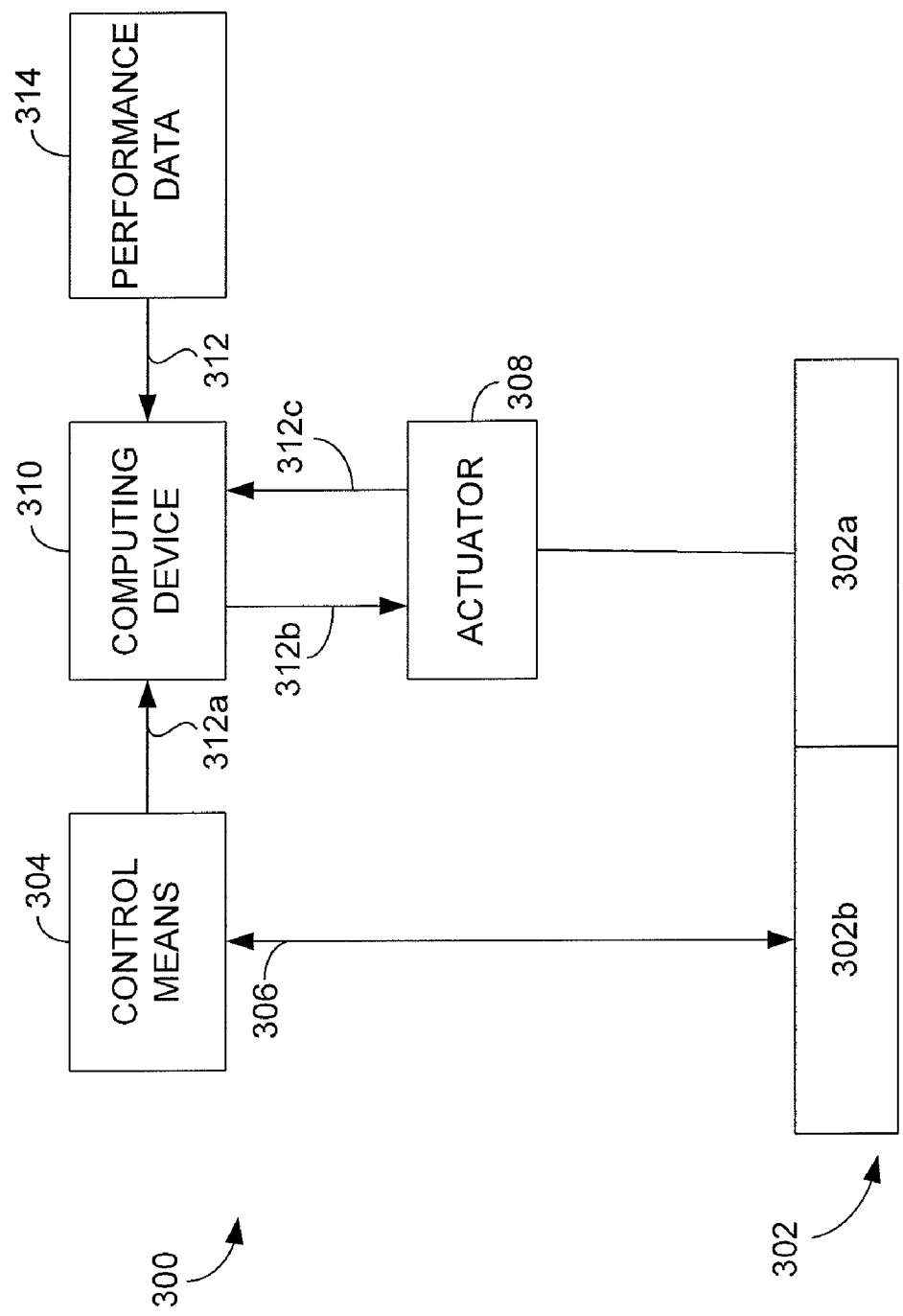
FIG. 3A is a block diagram of an embodiment of the present invention.
Figure 3B:
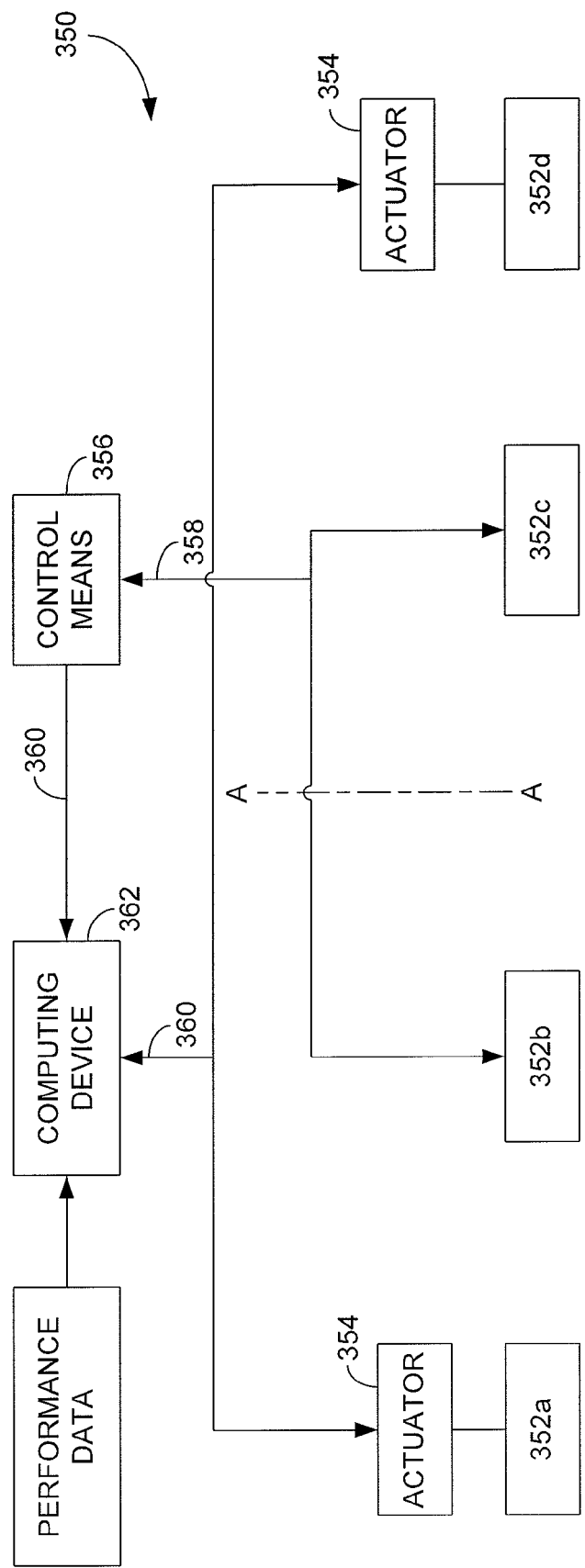
FIG. 3B is a block diagram of an alternate embodiment of the present invention.

Referring now to FIGS. 3A and 3B, block diagrams depicting embodiments of the present invention are shown. Referring first to FIG. 3A, a flight control system 300 comprises at least one control surface 302, such as an aileron, rudder, or elevator, having a plurality of independent segments 302a and 302b. One skilled in the art will understand that the quantity of control surfaces and independent segments will vary depending on at least aircraft class and flight envelope. The flight control system 300 also comprises a control means 304 having at least one force sensor therein for measuring operator effort applied to the control means 304. Typical control means include, but are not limited to, hand-operated controls for pitch and roll such as a yoke or stick, and foot-operated controls for yaw, such as pedals.

In addition to the control means, the flight control system 300 comprises a mechanical linkage 306, that is reversible, and directly couples the control means 304 to one of the independent segments to provide natural feedback to an operator. This mechanical linkage provides direct movement of an independent segment 302b that corresponds to operator movement of the control means 304. The mechanically coupled segment 302b can vary in size with a particular application, but will typically be one-third to one-half of the total control surface 302.

For the embodiment in FIG. 3A, the independent segment 302a is coupled to a powered servo actuator 308. This actuator is in turn coupled to a computing device 310 by signal connections 312. The specific type of signal connections will vary depending on the application, but can include force signals 312a, actuator command signals 312b, and position feedback signals 312c. The computing device 310 is also coupled to the control means 304 by a signal connection 312. In this configuration, the computing device 310 receives the force measurement from the control means 304 by way of the force signals 312a and determines the desired position of segment 302a that corresponds to the force applied to the control means 304. This position is determined from a predetermined schedule which is stored in the computing device 310 and can be based on factors including, but not limited to, measured input force, aircraft normal acceleration, airspeed, and altitude. The computing device 310 provides an actuator command signal 312b to the powered servo actuator 308 to position the independent segment 302a accordingly such that the total combined effects of all of the control surfaces produces the desired aircraft response to the operator's inputs.

In normal, non-failure conditions, the independent segments 302a and 302b both move to achieve the desired aircraft response. However, they may not move to the exact same position since the segments controlled by the computing device are used to optimize handling qualities. That is, depending on operator input, segments 302a may move a greater or lesser distance than segments 302b to accomplish the desired aircraft response. Should the operator attempt maneuvers outside of the allowable flight envelope, the computing device 310 could be used to reduce the effectiveness of segments 302a in order to protect the aircraft structure from damage.

In the event the mechanical linkage 306 jams such that segment 302b becomes inoperable, the remaining segments 302a controlled by the computing device 310 are still operable. Conversely, should a power failure occur in flight such that computing device 310 becomes inoperable, segments 302a will not operate. However, segment 302b is still operable by way of the mechanical linkage 306.

The control surfaces have independent segments that operate independent of each other. One of the segments is connected by a traditional mechanical linkage to the control means in the cockpit and operates and feels to the operator like a traditional control surface, however it has only a portion of the authority of previously monolithic surfaces common in the prior art. The other segment(s) of the control surface are powered and commanded by a computing device based on the operator's input forces to the mechanically-coupled segment. For example, when an operator applies 10 pounds of force into the yoke or stick, that force is transmitted manually to the mechanically-coupled segment, which deflects until the aerodynamic forces balance the operator's input. The same 10 pounds is measured by the computing device, and based on that and other parameters such as flight conditions, the computing device commands the powered segment of the control surface to the desired position. This may or may not be in line with the mechanically-coupled segment. The segments must be split to prevent the actuator force from masking the aerodynamic forces in the feedback to the operator and to allow the powered segment to provide the extra functions such as trim, envelope protection, and stability enhancement.

The control system of the present invention utilizes a plurality of individual segments 302 for a flight control surface. Since each of these segments, both manual and those coupled to the power servo actuators, operate simultaneously, the resulting impact on aircraft attitude and performance is a summation of the effects of the individual segments.

The computing device 310 can also receive performance data 314, including but not limited to altitude, acceleration, and airspeed from a variety of sensors. The computing device 310 utilizes this data to adjust the position of independent segment 302a that is coupled to servo actuator 308, as necessary, to maintain aircraft operation within a desired flight envelope. The present invention can also receive and act on other control commands such as from trim, autopilot, and stability augmentation systems, in place of independent actuators and control surfaces for these systems.

A more detailed embodiment of the present invention is shown in FIG. 3B and pertains to the flight control surfaces found on a wing of an aircraft. In this alternate embodiment, a flight control system 350 comprises four independent segments 352a, 352b, 352c, and 352d, with 352a and 352b on the left wing and 352c and 352d on the right wing, and centerline A-A indicating a fuselage of an aircraft. In this embodiment, each wing has an independent segment that is mechanically coupled to the control means and an independent segment that receives its input from a computing device. More specifically, segments 352a and 352d are each coupled to an actuator 354 and the actuators are, in turn, coupled to control means 356 by way of a signal connection 360 and a computing device 362. The remaining segments shown in FIG. 3B, 352b and 352c, are mechanically coupled to the control means 356 by way of a mechanical linkage 358. Although the embodiment shown in FIG. 3B only discloses two independent segments to each control surface on each wing, the present invention is not to be limited to such a configuration. In fact, the number of independent segments could be greater depending on the type of aircraft and desired flight envelope. Furthermore, alternate embodiments of the present invention may contain different quantity, size, and location of independent segments of the control surfaces without departing from the general scope of the invention.

Figure 4:
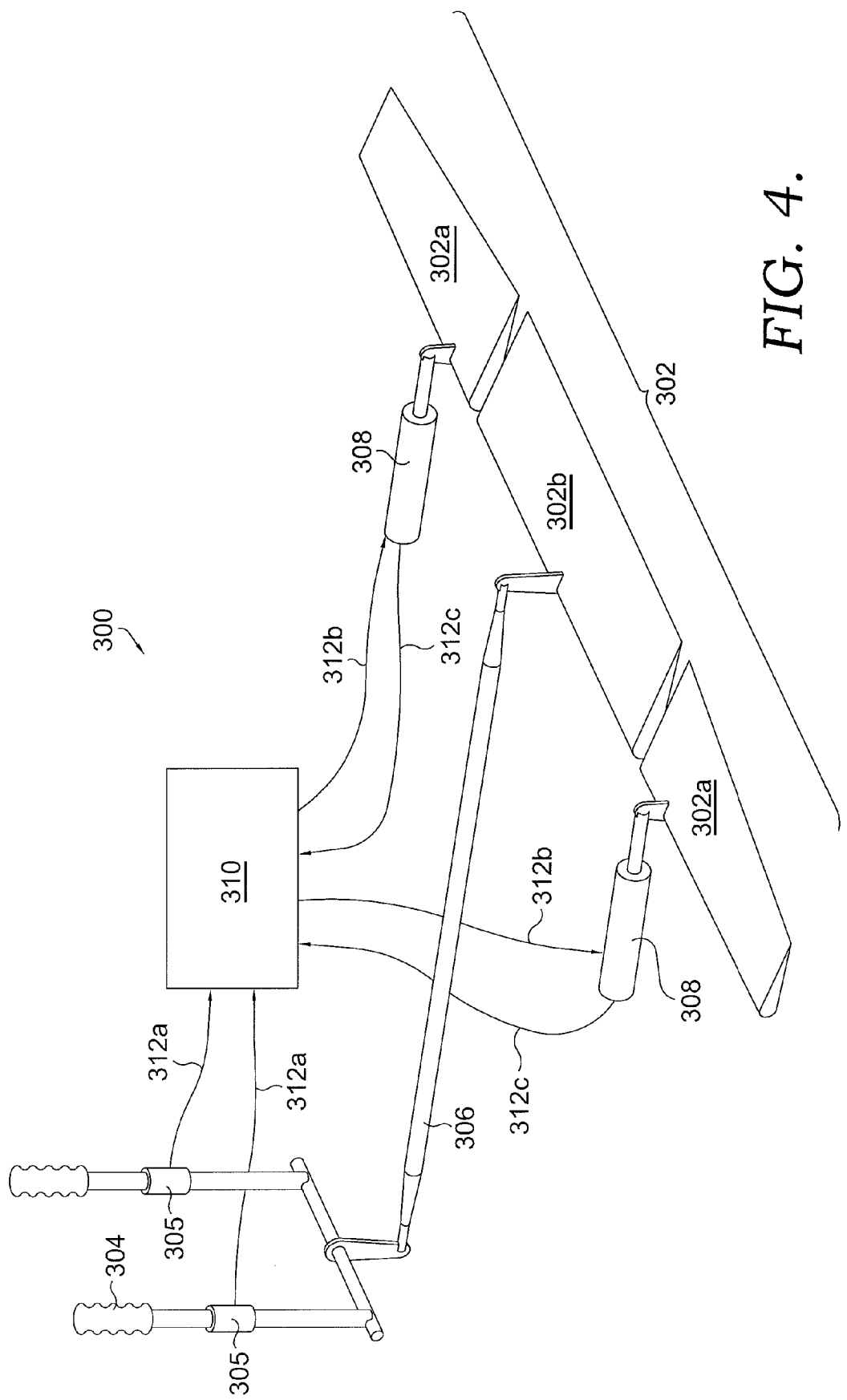
FIG. 4 is a simplified perspective view depicting the features of a first embodiment of the present invention.

Referring now to FIG. 4, a simplified flight control system is shown in perspective view depicting the features of an embodiment of the present invention. The flight control system depicted in FIG. 4 corresponds to the general arrangement for pitch control of an aircraft, such as those found on an elevator. This embodiment can be described in conjunction with the terminology previously discussed in reference to FIG. 3A. The flight control system 300 comprises at least one control surface 302 having a plurality of individual segments 302a and 302b, and a control means 304, which for this embodiment is a set of hand-operated control sticks, one for a pilot and a second for a co-pilot. Located in control means 304 are force sensors 305, which measure force input by an operator, and are also coupled to the computing device 310 by the signal connections 312a. In this embodiment where multiple operators have control means, the computing device 310 will average or prioritize the force inputs to determine the net command desired by the operators. The control means 304 is coupled to a segment 302b by a mechanical linkage 306. Coupled to segments 302a, in the embodiment shown in FIG. 4, are powered servo actuators 308. The servo actuators 308 are coupled to a computing device 310 by command signal connections 312b. Position sensors (not shown) in the servo actuators 308 provide position feedback signals 312c to the computing device 310.

Figure 5:
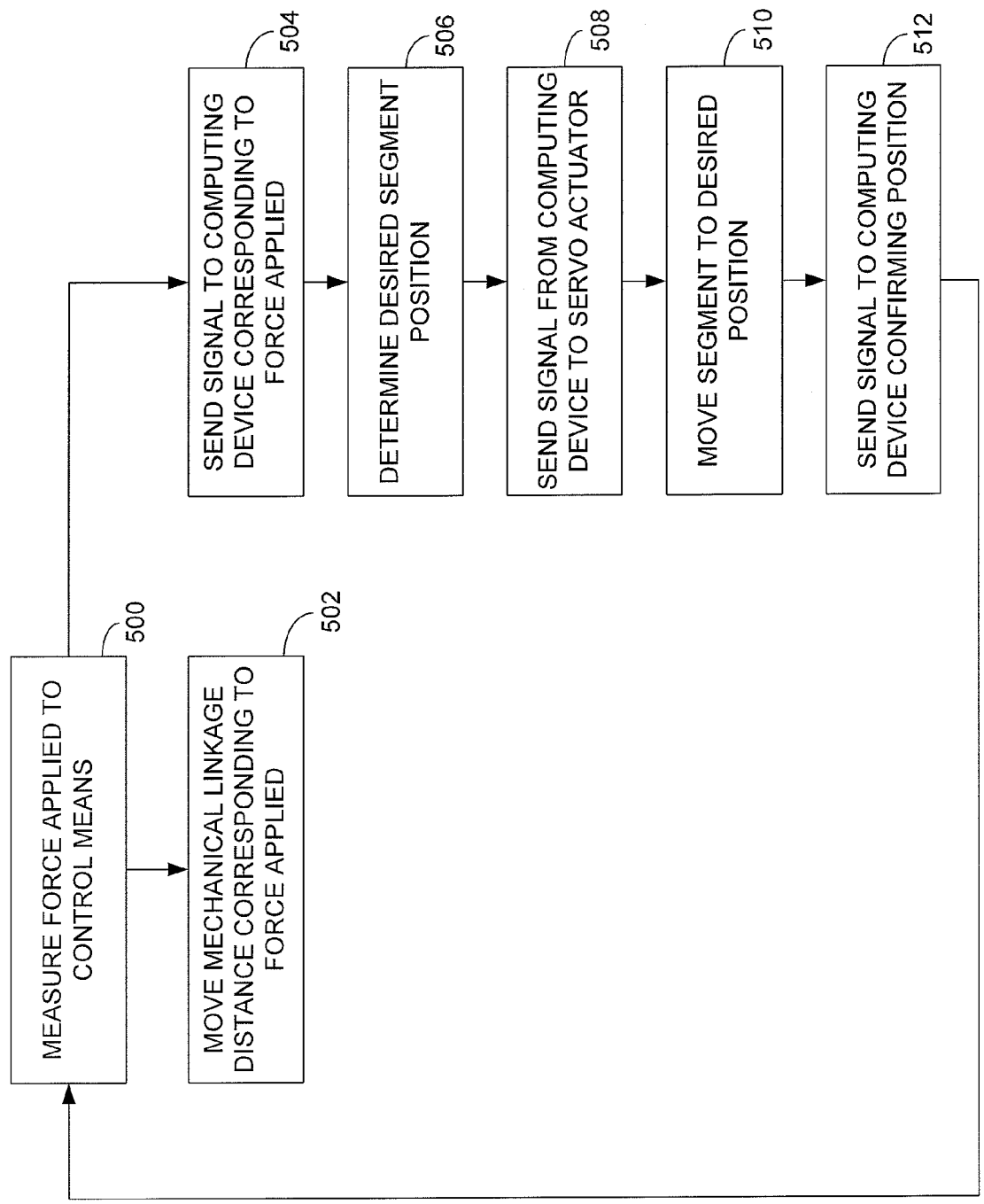
FIG. 5 is a flow diagram depicting an embodiment of the process disclosed in the present invention.

The operation of the control system can best be understood with reference to FIGS. 4 and 5. When movement of an aircraft in a particular direction is desired, the operator applies a force to control means 304. In a step 500, the force applied to the control means 304 is measured by at least one sensor 305. In a step 502, the mechanical linkage 306, which is coupled to the control means 304 moves the individual segment 302b a distance corresponding directly to the movement of the control means 304. The linkage movement will cause control surface 302b to deflect, increasing the aerodynamic forces on that surface, until the operator's applied load and the aerodynamic force on 302b are in equilibrium. A computerized control system operates in conjunction with the manual portion of the control system to move the remaining independent segments of the control surface 302a, such that a desired maneuver is accomplished, such as increasing the aircraft's pitch attitude.

In a step 504 a signal is sent from sensors 305 to the computing device 310 that corresponds to the force applied to the control means 304. In a step 506, the computing device 310 determines a desired position of the remaining segments (302a) that correspond to the force applied by the operator to the control means 304. In a step 508, the computing device 310 sends a signal across connection 312 to the servo actuator 308 corresponding to the desired position. Then in a step 510, the actuator moves the individual segments coupled thereto into the desired position and in a step 512, a signal is sent to the computing device confirming the position of the individual segments.

The position of the segments of the control surfaces are maintained as long as the force level is maintained on the control means. The process then returns to step 500 to measure the force applied to the control means 304. Should the force applied change, either greater or smaller or direction change, then the individual segments making up the control surface will move accordingly, including the manual surfaces and those controlled by the power servo actuators and computing device.

Figure 6:
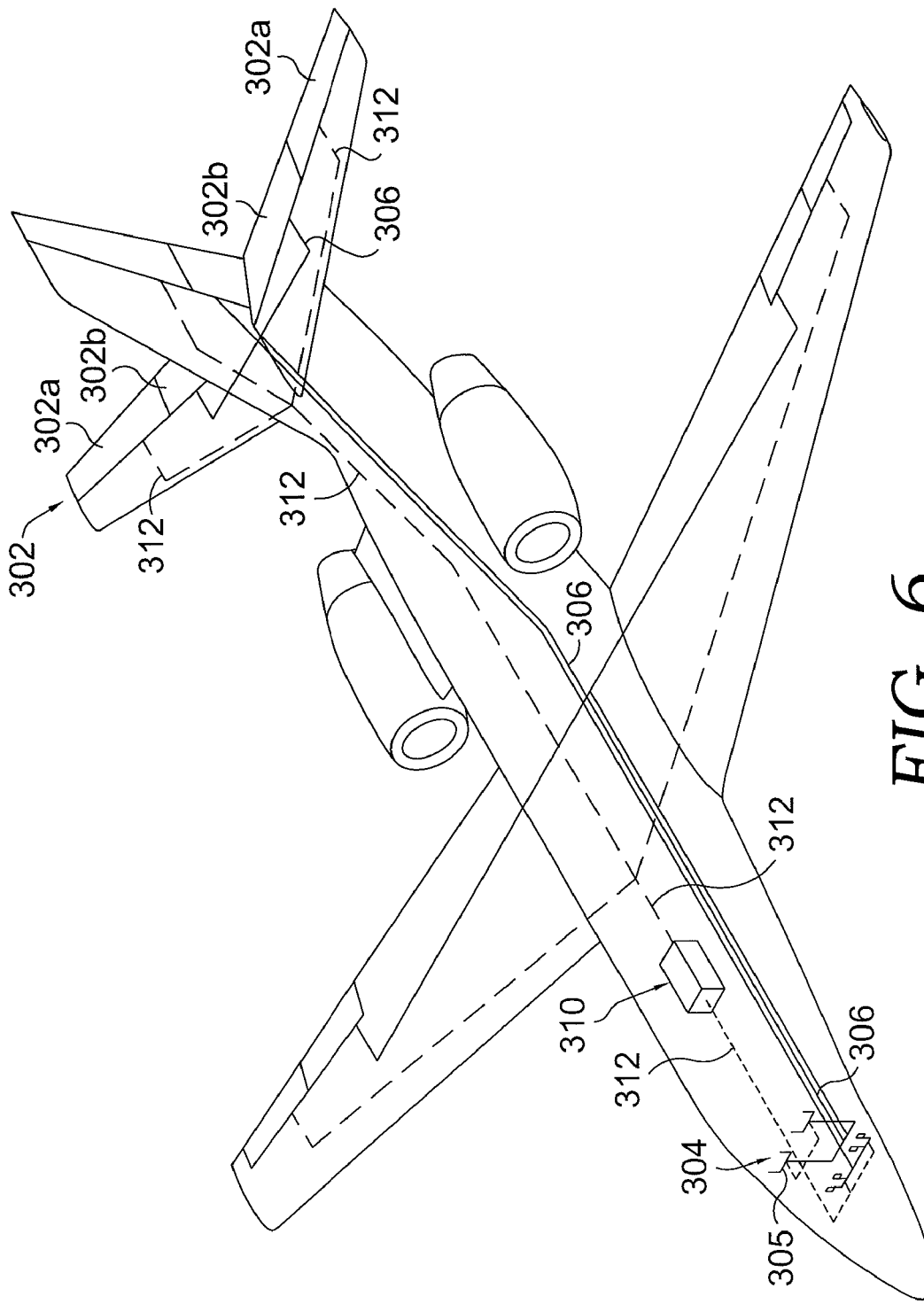
FIG. 6 is a perspective view of an aircraft incorporating the present invention.

An embodiment of the present invention is shown on an aircraft in FIG. 6, including control surfaces similar to those shown in FIG. 4. Utilizing the terminology previously discussed, control surface 302, also referred to as an elevator, has individual segments 302a and 302b, on each side of control surface 302. Segments 302a are coupled by signal to control means 304 through computing device 310, as indicated by a dashed line, while segments 302b are mechanically coupled to the control means 304 by mechanical linkage 306, as indicated by a solid line. The control means 304 has force sensors 305 that send a signal across signal connection 312 to a computing device 310. The computing device 310 then sends a signal across another signal connection 312 to actuators 308 (not shown), which are in turn coupled to segments 302a.

For aircraft operating with significantly more gross weight and at even higher airspeeds, e.g., commercial jetliners, the reversible mechanical manual portion of the system described in the above may prove insufficient. Referring back to the first embodiment disclosed in FIG. 4, the mechanical arrangement comprising control means/stick 304 and link 306 may be unable to provide the power necessary to properly actuate control surface 302b, and variations in the control surface hinge moments may be unable to provide the appropriate feedback and feel to the pilot.

Figure 7:
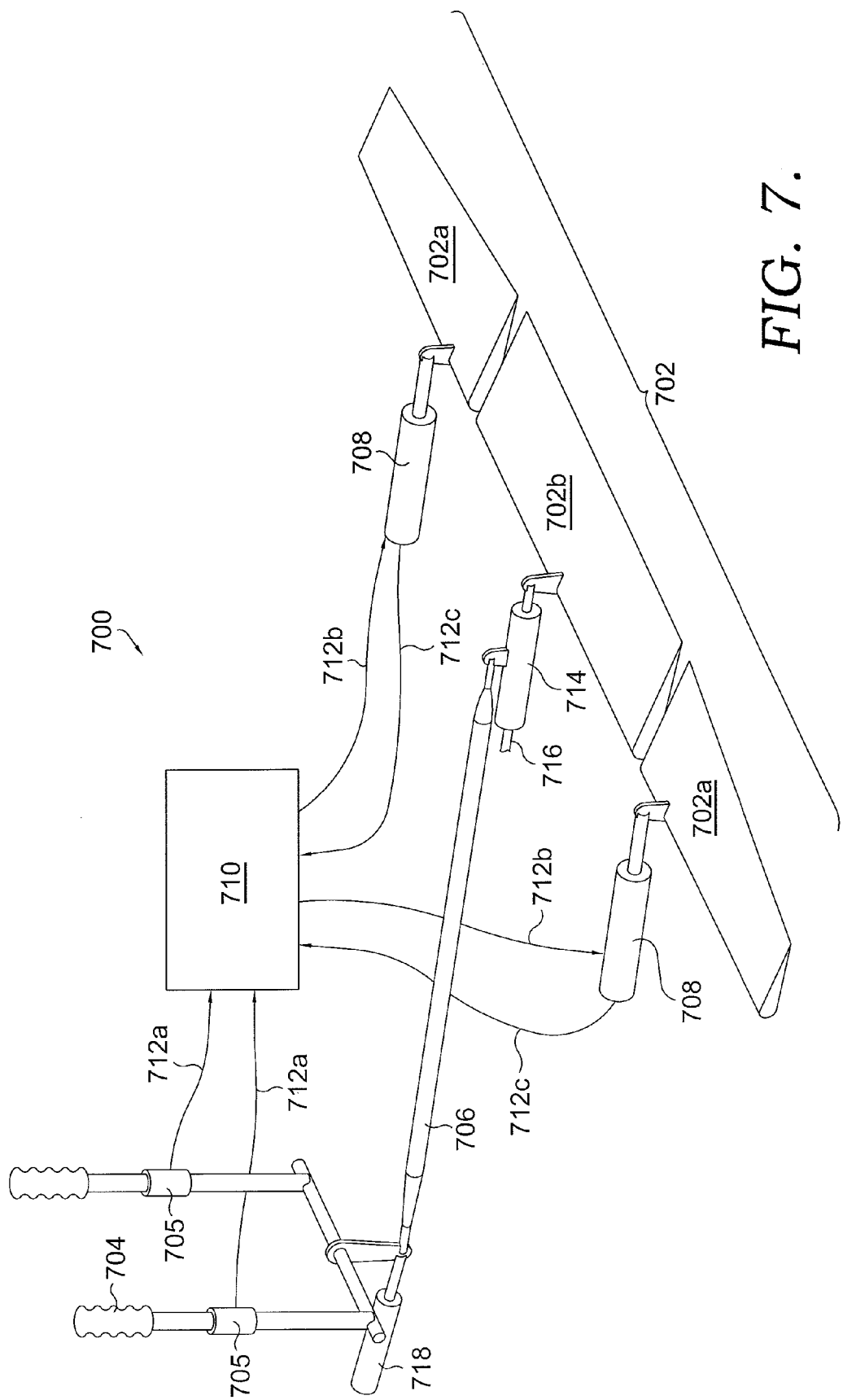
FIG. 7 is a simplified perspective view depicting the features of a second embodiment of the present invention.

Under these circumstances, a second embodiment like that shown in FIG. 7 may be preferred. As can be seen from the figure, this embodiment 700, like the first, comprises at least one control surface 702 having a plurality of individual segments 702a and 702b. Like with the first embodiment, surfaces 702a are operated using electronically controlled servoactuators 708. And also like the first embodiment, a mechanical linkage 706 is used which is activated using a hand-operated control stick 704 including force sensors 705 which measure force input by an operator, and are also coupled to a computing device 710 by signal connections 712a.

This embodiment operates in substantially the same way as was described for the FIG. 4 embodiment except that drive linkage 706 is adapted to selectively expand or contract a mechanically-activated power control device 714. At the aft end, device 714 is used to activate control surface 702b. At the forward end, PCU support rod 716 is secured to a fixed structural member (not shown) on the aircraft so that rod 716 such that PCU 714 can bear against it when activated (expanded or contracted).

When the pilot moves the cockpit controls 704 from a first position to a second position, device 714 will receive the resulting mechanical displacement through linkage 706 and provides the force necessary to rotate control surface 702b to a corresponding and directly related angular displacement. Cockpit controls 704 are shown as being hand operated in FIG. 7, but could alternatively be a foot-operated arrangement. In the preferred embodiment, power control device 714 is a mechanically driven power control unit (PCU). One skilled in the art will recognize that mechanically driven PCUs are commercially available powered devices which are typically mounted on the trailing edge or other longitudinal stabilizing surface of the aircraft and can be used to obtain pitch-control moments. The mechanically-driven variety used herein receive mechanical input from an input rod and then irreversibly produce an output having the force necessary to create a corresponding angular displacement of the control surface when the craft is in flight. Although a mechanically-driven PCU is used in the second embodiment here, however, other devices exist which might be used herein as well that would fall within the broad objectives of the present invention.

Device 714 is unidirectional in that, although it acts on control inputs received from linkage 706, forces received from the control surface 702b, e.g., due to wind impingement, will not be in any way experienced back through linkage 706 to the pilot. Because the pilot does not experience natural feedback forces from the air loads on the control surfaces, an artificial feel system 718 is employed on the mechanical control system.

Artificial feel system 718 is at the other end of link 706, and connected into the controls 704 in a known manner, is an artificial feel system 718. System 718 provides a spring-back effect which will tend to center the control column 704 to a neutral position. Thus, if you pull stick 704 back from neutral, the spring will resist and try to push it back to neutral, and if you push stick 704 forward from neutral, it will try to pull it back. The strength of the spring should be selected such that it provides the appropriate amount of spring back force to the pilot such that the pilot's interaction with the control system is similar to that of an airplane with natural force feedback. More complex feel systems and or force variants could be used as well. For example, the variants could have non-linear force curves, or modify the forces based on aircraft performance (i.e., make the forces increase as the airplane goes faster).

The particular artificial feel system used in the preferred embodiment is a bungee system. But in its most elemental form, system 718 could be a spring sized appropriately to generate favorable pilot forces for a given stick deflection. One skilled in the art will recognize there are many possible variations of such an artificial feedback system, including systems that use other devices such as bobweights and dampers, or are variable in their response relative to aircraft performance parameters.

Like with the last embodiment, the FIG. 7 electronically controlled actuator devices 708 will move the outer portions 702a in concert with the partially mechanically moved inner portion 702b. Again, this is accomplished using a computing device 710 which receives signals from force sensors 705. These signals will be representative of operator effort, which is in turn a function of the operating characteristics of the artificial feel system. Processes executed on computing device 710, then will electronically control the actuators 708 for the purpose of controlling the position of portions 702a. In normal, non-failure conditions, the independent segments 702a and 702b both move to achieve the aircraft control. As with the previous embodiment, the surfaces may not move exactly together, but the aerodynamic sum of their effects results in the desired aircraft response. Also as in the previous embodiment, the computer controlled surfaces can be utilized to optimize aircraft handling qualities; unlike the previous embodiment, a variable artificial feel system also allows some optimization of the handling qualities through the mechanically commanded surface.

With respect to operational processes, the FIG. 7 embodiment would function in substantially the same manner disclosed in FIG. 5, except that step 502 would include the assistance of mechanically-driven PCU 714, and artificial feedback system 718 would give the pilot the spring back feel described above.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method of operating a control surface on an aircraft, said control surface having a first independent section and a second independent section, said method comprising:
    providing a device which receives inputs from a user via a mechanical system and angularly displaces said first section using a hydraulic device which is acted on by the mechanical system without any computer-aided correction;
    receiving readings including (i) force measurements representative of operator effort from force sensors located on a pilot-operated control means which is a part of the mechanical system, and (ii) acceleration, airspeed, and altitude parameters into a computer system, the computer system using the readings to electronically control said second section and angularly displace said second section, the second section compensating for the lack of computer-aided correction given to the first section, the aerodynamic sum of effects caused by positions of the first section and second section together resulting in a desired aircraft response; and
    providing an artificial feel system in the mechanical, system which provides variable resistance to the control means based either on aircraft performance parameters or nonlinear force curves.

2. A flight control system for an aircraft, said system comprising:
    a control stick having two upright portions, each upright portion having a handle on top and a force sensor below the handle to receive pilot inputs;
    a control surface split into three portions including a middle portion and two lateral portions, one lateral portion on each side of the middle portion, the lateral portions being operable independently from the middle portion;
    a mechanical linkage connected to the control stick by a lever, and running to a power control unit, the power control unit being coupled to the middle portion of the control surface, the linkage translating movements of the control stick to operate the power control unit to position the middle portion;
    an electronically controlled actuator coupled to each of the lateral portions for controllably positioning the lateral portions according to pilot inputs recognized by the force sensors, the force sensors transmitting signals to a computer, the computer then using the force sensor signals along with avionics data to control the lateral portions using the actuators and move the lateral portions such that they compensate for an angular position of the middle portion to maintain the control surface within a desired flight envelope; and
    an artificial feel system attached to the lever from an opposite side of the control stick from the mechanical linkage, the artificial feel system giving the pilot feedback, and simulating the feel of a purely mechanical system, the artificial feel system providing variable resistance based on one of aircraft performance parameters and non-linear three curves.

3. The flight control system of claim 2 wherein the artificial feel system includes a bungee arrangement.

4. The flight control system of claim 2 wherein the artificial feel system provides variable resistance based on aircraft performance parameters.

5. The flight control system of claim 2 wherein the artificial feel system provides variable resistance based on nonlinear force curves.

6. The flight control system of claim 2 wherein the artificial feel system is a bungee system attached directly to the control stick.

7. The flight control system of claim 2 wherein the artificial feel system provides variable resistance based on aircraft performance parameters.

8. The flight control system of claim 2 wherein the artificial feel system provides variable resistance based on nonlinear force curves.

* * * * *